(12) United States Patent
Cason et al.

(10) Patent No.: US 12,111,428 B2
(45) Date of Patent: Oct. 8, 2024

(54) ACOUSTIC DISTANCE RANGING SYSTEM

(71) Applicant: Shure Acquisition Holdings, Inc., Niles, IL (US)

(72) Inventors: David Grant Cason, Palatine, IL (US); Mark Gilbert, Palatine, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 17/457,139

(22) Filed: Dec. 1, 2021

(65) Prior Publication Data

US 2022/0171042 A1    Jun. 2, 2022

Related U.S. Application Data

(60) Provisional application No. 63/120,050, filed on Dec. 1, 2020.

(51) Int. Cl.
*G01S 7/536*    (2006.01)
*G01S 15/34*    (2006.01)

(52) U.S. Cl.
CPC ............. *G01S 7/536* (2013.01); *G01S 15/34* (2013.01)

(58) Field of Classification Search
None
See application file for complete search history.

(56) References Cited

U.S. PATENT DOCUMENTS

| | | | |
|---|---|---|---|
| 5,550,549 A * | 8/1996 | Procter, Jr. | G01S 13/84 342/134 |
| 6,373,434 B1 * | 4/2002 | Hayakawa | G01S 13/84 342/458 |
| 6,549,562 B1 * | 4/2003 | Olaker | H04B 1/69 375/139 |
| 7,260,227 B2 | 8/2007 | Higashihara | |
| 7,414,705 B2 * | 8/2008 | Boillot | G01S 15/104 356/28 |
| 7,623,413 B2 | 11/2009 | McFarland | |
| 7,869,611 B2 | 1/2011 | Asada | |
| 7,949,139 B2 | 5/2011 | McKee Cooper | |
| 7,961,893 B2 | 6/2011 | Kino | |

(Continued)

FOREIGN PATENT DOCUMENTS

| | | | | |
|---|---|---|---|---|
| CN | 106371097 A * | 2/2017 | | G01S 13/26 |
| DE | 3800800 A1 * | 1/1988 | | G01S 15/10 |

(Continued)

OTHER PUBLICATIONS

Peng, Chunyi, et al. "Beepbeep: a high accuracy acoustic ranging system using cots mobile devices." Proceedings of the 5th international conference on Embedded networked sensor systems. 2007. (Year: 2007).*

(Continued)

*Primary Examiner* — Isam A Alsomiri
*Assistant Examiner* — Jonathan D Armstrong
(74) *Attorney, Agent, or Firm* — Neal, Gerber & Eisenberg LLP

(57) ABSTRACT

A wireless audio system configured to perform an acoustic ranging operation is disclosed. The audio system comprises an audio transmitter, and audio receiver, and is configured to determine a distance between the audio transmitter and the audio receiver.

15 Claims, 5 Drawing Sheets

(56) References Cited

U.S. PATENT DOCUMENTS

| | | | |
|---|---|---|---|
| 8,131,215 B2* | 3/2012 | Swope | H04W 64/00 |
| | | | 455/457 |
| 8,169,369 B2* | 5/2012 | Gonzalez | G01S 11/02 |
| | | | 342/458 |
| 8,306,236 B2 | 11/2012 | Asada | |
| 8,811,119 B2 | 8/2014 | Aarts | |
| 9,024,748 B2* | 5/2015 | Haase | G08B 21/02 |
| | | | 340/532 |
| 9,661,432 B2 | 5/2017 | Silzle | |
| 11,493,619 B2* | 11/2022 | Chowdhury | G01S 7/03 |
| 2007/0121097 A1* | 5/2007 | Boillot | G01S 15/104 |
| | | | 356/28 |
| 2007/0162185 A1 | 7/2007 | McFarland | |
| 2014/0070942 A1* | 3/2014 | Haase | G08B 21/02 |
| | | | 340/532 |
| 2014/0113547 A1* | 4/2014 | Kwak | H04W 8/005 |
| | | | 455/39 |
| 2014/0192622 A1* | 7/2014 | Rowe | G01S 5/18 |
| | | | 367/117 |
| 2014/0314250 A1 | 10/2014 | Park | |
| 2015/0219755 A1* | 8/2015 | Borggaard | G01S 11/14 |
| | | | 367/118 |
| 2017/0003176 A1 | 1/2017 | Phan Le | |
| 2017/0270775 A1* | 9/2017 | Haase | G01S 3/86 |
| 2019/0222955 A1* | 7/2019 | Abiri | H04W 12/08 |
| 2019/0310357 A1 | 10/2019 | Davis | |
| 2020/0041633 A1 | 2/2020 | Torfs | |
| 2020/0367810 A1* | 11/2020 | Shouldice | A61B 5/4818 |
| 2021/0275056 A1* | 9/2021 | McMahon | A61B 5/11 |

FOREIGN PATENT DOCUMENTS

| | | | |
|---|---|---|---|
| EP | 2965312 | 1/2016 | |
| JP | 2006197496 | 7/2006 | |
| WO | WO-9603689 A1 * | 2/1996 | G01S 1/045 |
| WO | 2013088281 | 6/2013 | |
| WO | 2013117964 | 8/2013 | |
| WO | WO-2018050913 A1 * | 3/2018 | A61B 5/0816 |
| WO | 2019122413 | 6/2019 | |
| WO | WO-2019122412 A1 * | 6/2019 | A61B 5/02 |

OTHER PUBLICATIONS

Nakayama, et al., "Acoustic distance measurement based on phase interference using the cross-spectral method," Acoustical Science & Technology, vol. 34, No. 3, 2013, 9 pp.

Packi, et al., "A wearable system for the wireless experience of extended range telepresence, " 2010 IEEE/RSJ International Conference on Intelligent Robots and Systems, Oct. 2010, pp. 5226-5231.

International Search Report and Written Opinion for PCT/US2021/072665 dated Apr. 7, 2022, 11 pp.

* cited by examiner

ACOUSTIC DISTANCE RANGING SYSTEM

CROSS-REFERENCE TO RELATED APPLICATIONS

This application claims the benefit of and priority to U.S. Provisional Patent Application No. 63/120,050, filed on Dec. 1, 2020, the contents of which are incorporated herein in their entirety.

TECHNICAL FIELD

This application generally relates to wireless audio systems including at least one audio transmitter and at least one audio receiver, and methods and systems for distance measurement between devices of the audio system using acoustic signals.

BACKGROUND

Audio systems typically operate best when information is known about the spatial relationship between devices of the system. For example, the distance between speakers or audio output device, microphones or audio input devices, and any other audio device in the audio system can be used to build a model of the environment. This model, and/or simply the distances between the devices themselves, can be used to adjust the speakers, microphones, and/or other devices such that the input and output signals are clearer, have less interferences, are positioned at the correct location, and are otherwise improved.

Accordingly, there is an opportunity for a wireless audio system that enables accurate distance measurement between devices of the system.

SUMMARY

The present disclosure is intended to describe and illustrate example methods and systems for acoustic distance ranging. In one example, a method operable by an audio system comprises transmitting, at a first point in time by an audio transmitter, an audio ranging signal having a first frequency. The method also comprises receiving, at a second point in time by an audio receiver, the audio ranging signal having the first frequency. The method further comprises transitioning, at a third point in time by the audio transmitter, the audio ranging signal from the first frequency to a second frequency. The method still further comprises receiving, at a fourth point in time by the audio receiver, the transition of the audio ranging signal from the first frequency to the second frequency. The method also comprises determining a distance between the audio transmitter and the audio receiver based on (1) a difference between the third point in time and the fourth point in time, and (2) a determined speed of sound.

In another example, an audio system comprises an audio transmitter configured to transmit an audio ranging signal. The audio system also comprises an audio receiver configured to receive the audio ranging signal. The audio system further comprises a processor communicatively coupled to the audio transmitter and the audio receiver. The processor is configured to, at a first point in time, cause the audio transmitter to transmit the audio ranging signal having a first frequency. The processor is also configured to determine that the audio receiver has received, at a second point in time, the audio ranging signal having the first frequency. The processor is further configured to, at a third point in time, cause the audio transmitter to transition the audio ranging signal from the first frequency to a second frequency. The processor is further configured to determine that the audio receiver has received, at a fourth point in time, the transition of the audio ranging signal from the first frequency to the second frequency. And the processor is yet further configured to determine a distance between the audio transmitter and the audio receiver based on (1) a difference between the third point in time and the fourth point in time, and (2) a determined speed of sound.

In another example, a non-transitory, computer-readable memory has instructions stored thereon that, when executed by a processor, cause the performance of a set of acts. The set of acts comprises transmitting, at a first point in time by an audio transmitter, an audio ranging signal having a first frequency. The set of acts also comprises receiving, at a second point in time by an audio receiver, the audio ranging signal having the first frequency. The set of acts further comprises transitioning, at a third point in time by the audio transmitter, the audio ranging signal from the first frequency to a second frequency. The set of acts still further comprises receiving, at a fourth point in time by the audio receiver, the transition of the audio ranging signal from the first frequency to the second frequency. And the set of acts yet further comprises determining a distance between the audio transmitter and the audio receiver based on (1) a difference between the third point in time and the fourth point in time, and (2) a determined speed of sound.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
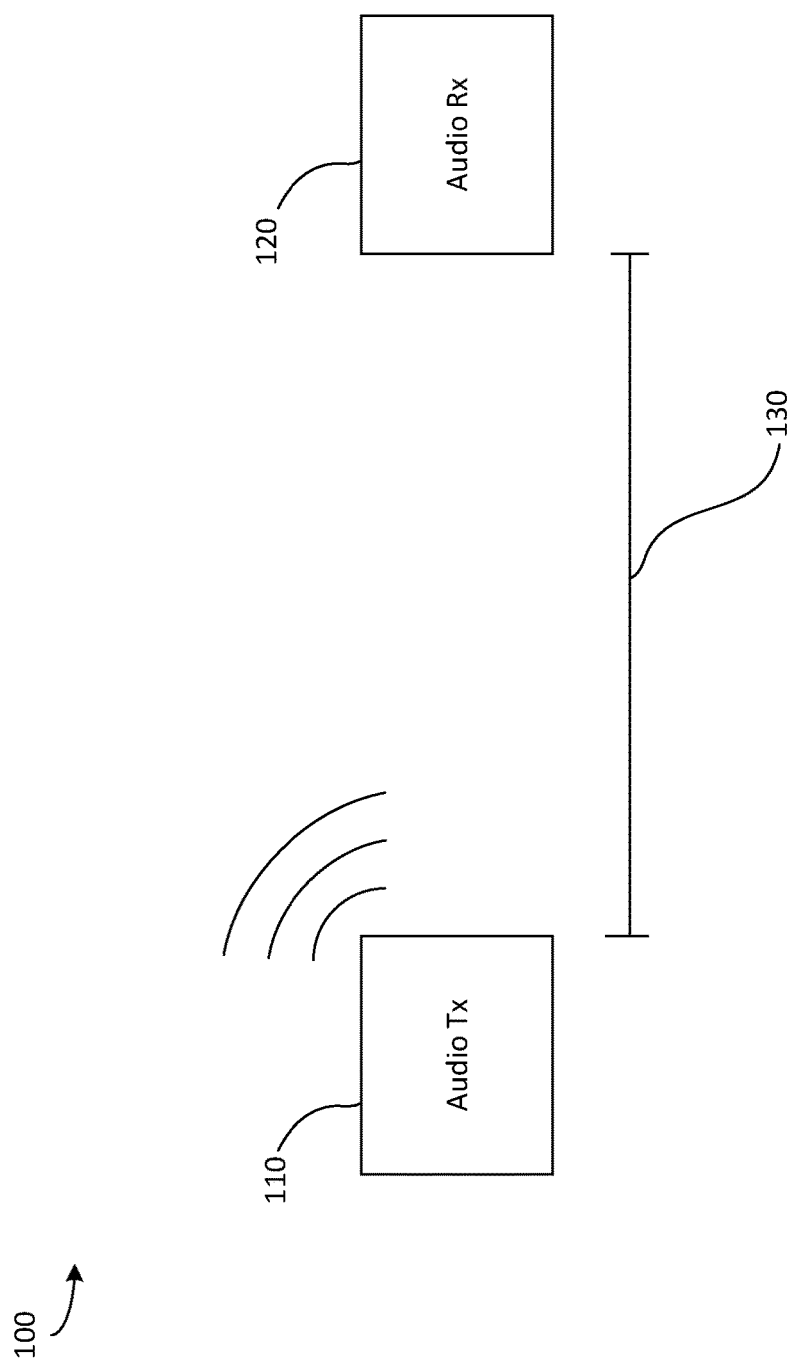
FIG. 1 is a simplified schematic diagram of a wireless audio system configured to perform acoustic distance ranging, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Audio systems can be used in a variety of different contexts. In many contexts, such as a conference room, it can be beneficial to determine the exact distance between devices of the audio system. For example, where the audio system comprises multiple microphone arrays positioned around a conference room, it can be beneficial to ensure that they are spaced appropriately for optimal performance.

Furthermore, it may be beneficial to use existing hardware to determine the distance between devices. While laser ranging techniques or other techniques may be used, they may require additional hardware and electronics in order to function.

Embodiments of the present disclosure enable the determination of distances between devices of the audio system using acoustic frequencies, thereby making use of the existing hardware of the devices. To determine a distance between a first device and a second device, one of the devices must have the ability to function as an audio transmitter, and one of the devices must have the ability to function as an audio receiver. The first and second devices may be referred to herein as the "audio transmitter" and the "audio receiver," or simply the "transmitter" and "receiver." In some examples, the audio transmitter may be configured to generated sound, and thus may be referred to as a sound generating device.

In some examples, the system operates using a shared frame of reference. One example way of having a shared frame of reference comprises using a common clock or synced clock between devices. However, it should be appreciated that other techniques for having a shared frame of reference may be used as well, including those techniques that do not include a common or synced clock.

In an example embodiment, the audio transmitter begins by initiating an acoustic distance ranging operation. The audio transmitter begins transmitting an audio ranging signal at a first frequency. After an amount of time, the audio transmitter begins a transition of the audio ranging signal from the first frequency to a second, different, frequency. The audio receiver receives the audio ranging signal, and processes the signal to determine a time at which the transition from the first frequency to the second frequency occurred. The timing of the transition from the first frequency to the second frequency is an important metric to use in determining the distance, because it enables a more accurate measurement than would otherwise be possible. If instead the system were to use a single frequency, or a transition from the audio transmitter being off to being on at a first frequency, the added mechanical delay of turning the speaker on introduces noise and/or distortion. The added mechanical delay may also be variable, introducing an unknown delay that causes any resulting distance measurement to have reduced precision. Thus, using a transition in frequencies while the audio transmitter is currently "on" enables more precise and accurate measurements because that additional noise and/or distortion is not introduced.

Then, by calculating the time that it took for the audio ranging signal to travel from the audio transmitter to the audio receiver, and based on the known speed of sound, the audio system can determine the distance between the two devices. Because the speed of sound is known within a small margin (e.g., the speed varies slightly based on temperature, pressure, etc.), the calculated duration of travel of the audio ranging signal from the audio transmitter to the audio receiver in seconds can be multiplied by the speed of sound in meters per second to determine a distance between the audio transmitter and the audio receiver in meters. The above example results in a distance measurement in meters, however it should be appreciated that the units used can vary.

FIG. 1 illustrates an example audio system 100, in which embodiments of the present disclosure may operate. The audio system 100 comprises an audio transmitter 110 and an audio receiver 120. The system may also comprise a processor, access point, hub, or other connected device as well. Further, the processor, access point, and/or hub may be integrated with the audio transmitter 110 and/or the audio receiver 120.

The audio transmitter 110 may comprise a speaker, an array of speakers, and/or any device capable of emitting audible sound. The speaker may be integrated into a larger device, which may comprise one or more microphones or other audio devices as well. The audio transmitter 110 may be configured to transmit an audio ranging signal, which may be used to determine a distance between the audio transmitter 110 and the audio receiver 120.

The audio receiver 120 may comprise a microphone, an array of microphones, and/or any device capable of receiving and detecting audible sound. The microphone may be integrated into a larger device, which may comprise one or more speakers or other audio devices as well. The audio receiver 120 may be configured to receive the audio ranging signal emitted by the audio transmitter 110, which may be used to determine a distance between the audio transmitter 110 and the audio receiver 120.

The processor, which may be part of the audio transmitter 110, audio receiver 120, and/or separate but communicatively coupled to the audio transmitter 110 and audio receiver 120, may be configured to carry out one or more of the functions described herein. For example, the processor may initiate the start of an acoustic distance ranging operation by controlling the audio transmitter 110 to begin transmitting the audio ranging signal. Additionally, the processor may be configured to use the timing data determined by the audio transmitter 110 and the audio receiver 120 to calculate the distance between the two devices. Furthermore, the processor may be integrated with a user interface, or may be communicatively coupled to a device that comprises a user interface. The processor may receive commands and information from a user via this user interface, in order to initiate the acoustic distance ranging operation, and/or to provide the calculated distance to the user, and/or to take various actions in response to the calculate distance.

It should be understood that the term processor used herein should not be limited to any particular type or functionality. Any suitable processor or controller may be used, including digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included in the understanding of a processor herein. It should further be understood that while reference is made to a single processor, it is contemplated that multiple processors may be used to perform the functionality described herein.

Figure 2:
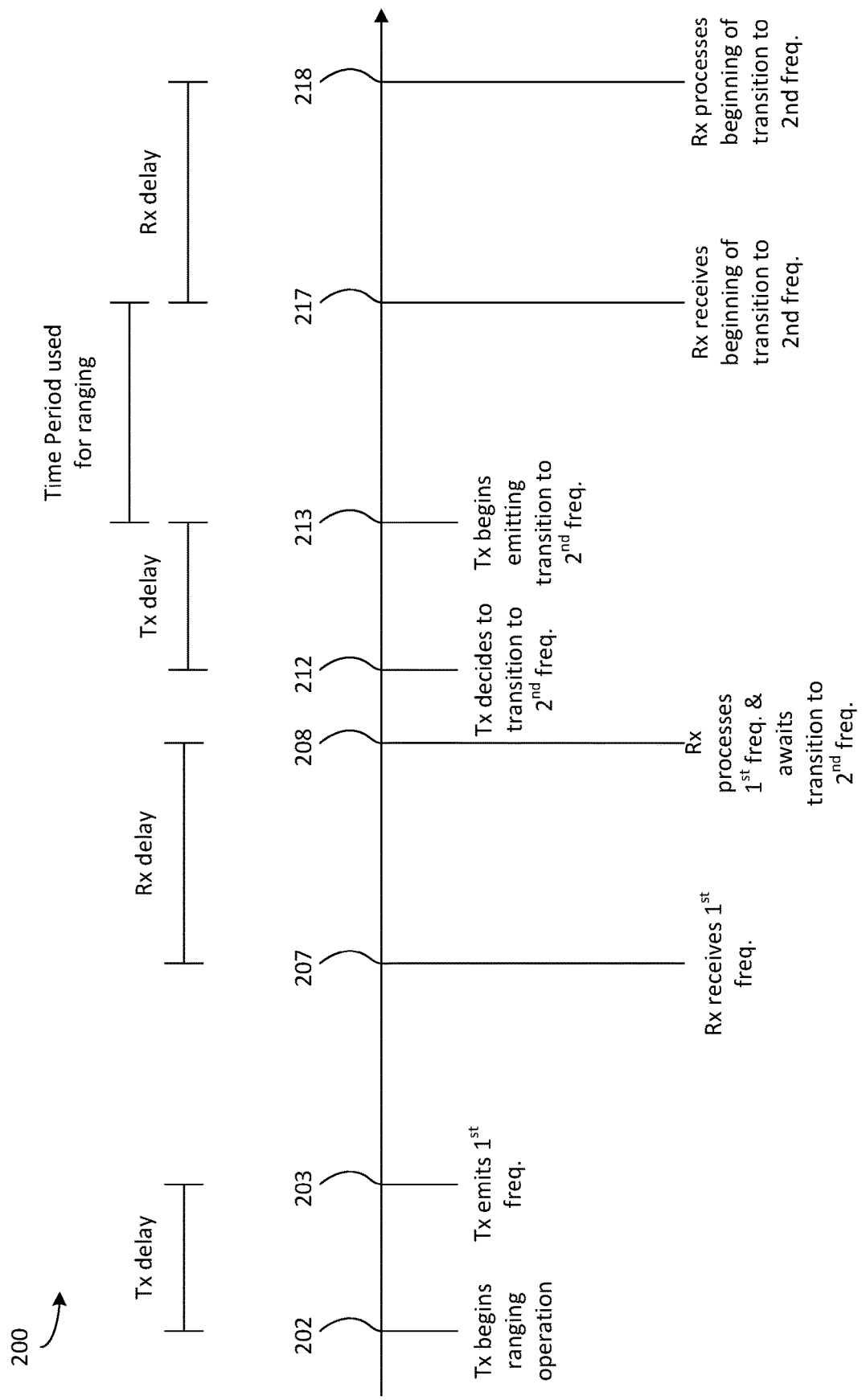
FIG. 2 is a simplified schematic diagram of an example timing of an acoustic distance ranging operation involving an audio ranging signal transitioning between two frequencies, in accordance with some embodiments.

FIG. 2 illustrates a simplified timing diagram of an acoustic ranging operation. In the timing diagram, the events positioned further to the right occur later in time than those on the left. Additionally, the spacing between events is not necessarily to scale, but has been illustrated to reflect relative timing. The timing illustrated by points 202-218 illustrates some of the actions and events that occur during the acoustic ranging operation. The diagram of FIG. 2 illustrates that the audio transmitter transitions from outputting the audio ranging signal at the first frequency to outputting the audio ranging signal at the second frequency after reception of the audio ranging signal at the first frequency by the audio receiver. However, this order of events (e.g., the transition to the second frequency occurring after the reception of the audio ranging signal at the first frequency by the audio receiver) is not necessarily required, and is merely one example of the order of events. In some embodiments, the audio transmitter may begin the transition from outputting the audio ranging signal at the first frequency to outputting the audio ranging signal at the second frequency before the audio ranging signal at the first frequency is received by the audio receiver. The timing between the initial transmission of the audio ranging signal at the first frequency and the beginning of the transition to transmitting the audio ranging signal at the second frequency by the audio transmitter occurs or is controlled independently from when the audio receiver receives the audio ranging signal at the first frequency.

An initial step (not shown) comprises a determination that the acoustic ranging operation should begin. This step may comprise receiving input via a user interface or communication interface that is part of, or is communicatively coupled to, the audio transmitter 110 and/or audio receiver 120 (e.g., a hub or access point).

At point 202, the acoustic ranging operation comprises making a determination that the audio transmitter should begin the acoustic ranging operation by transmitting the audio ranging signal at a first frequency. Point 202 may be the point in time at which a processor associated with the audio transmitter initiates the acoustic ranging operation, and starts the internal audio transmitter process to begin emitting the audio ranging signal.

At point 203, the acoustic ranging operation comprises the audio transmitter beginning to emit the audio ranging signal at the first frequency. Point 203 may be referred to as the "first point in time" at which the speaker of the audio transmitter begins to physically move to cause the audio ranging signal to be emitted. The delay between points 202 and 203 (e.g., the delay between when the decision to emit the audio ranging signal and when the audio ranging signal is actually emitted) is caused by digital and analog hardware delay associated with the audio transmitter. The digital component of the audio transmitter delay includes buffering delays, while the analog component includes delays due to digital to analog conversion, filtering, and any other physical delays. The audio transmitter delay may vary from device to device, and/or from product line to product line. The audio transmitter delay may be determined based on manufacturing tolerances and/or based on an average delay from multiple devices of the same type. In some examples, a typical audio transmitter delay may be a few (e.g., 3) samples or less at 48 kHz.

During the time between point 203 and point 213, the audio transmitter continues to emit the audio ranging signal at the first frequency.

During the time between point 203 and point 207, the audio ranging signal travels through the air between the audio transmitter and the audio receiver (e.g., the audio ranging signal time of flight).

At point 207, the audio receiver first receives the audio ranging signal emitted by the audio transmitter. Point 207 may be referred to as the "second point in time" at which the audio ranging signal having the first frequency is received by the audio receiver.

At point 208, the acoustic ranging operation comprises the audio receiver processing the audio ranging signal and first determining that the audio ranging signal at the first frequency has been received. The delay between points 207 and 208 (e.g., the delay between when the audio ranging signal is first received and when the audio receiver determines that the audio ranging signal has been received) is caused by digital and analog hardware delay associated with the audio receiver. The audio receiver delay may be due to the same or similar causes as the delay for the audio transmitter, including buffering delays, analog to digital conversion, filtering, and more. The audio receiver delay may vary from device to device, and/or from product line to product line. The audio receiver delay may be determined based on manufacturing tolerances and/or based on an average delay from multiple devices of the same type. In some examples, a typical audio receiver delay may be a few (e.g., 3) samples or less at 48 kHz.

At point 208, based on determining that the audio ranging signal has been received, the audio receiver may take one or more actions in response. For example, responsive to receiving and processing the audio ranging signal at the first frequency, the audio receiver may transmit a message indicating or validating that the audio ranging process is taking place. The audio receiver may also enter an audio ranging state, in which the audio receiver takes one or more actions to prepare for an upcoming reception of a transition in the audio ranging signal from the first frequency to a second frequency. The audio ranging state may also comprise preparation for a calculation or determination of the distance between the audio transmitter and the audio receiver based on one or more calculated or estimated points in time. The audio ranging state may also comprise preparation for transmission of data to one or more devices, such as: the audio transmitter, a hub or access point, a device comprising a user interface configured for interaction with a user, or another device.

At point 212, the audio ranging operation may further comprise the audio transmitter making a determination to transition the audio ranging signal currently being emitted from the first frequency to a second frequency. The second frequency must be different from the first frequency. The duration of time between point 202 and point 212 (e.g., the duration for which the audio transmitter emits the audio ranging signal at the first frequency), may be a preset duration of time. For example, the duration of time between points 202 and 212 may be any suitable duration based on the amount of delay or timing of certain events associated with the operation of the system. The various delays associated with the system can include: (1) the internal delay associated with the audio transmitter, (2) the internal delay associated with the audio receiver, and (3) the delay or duration of time required for the audio ranging signal to traverse the distance between the devices. The internal audio transmitter delay may be approximately 150 us. The internal audio receiver delay may be in the same order of magnitude as the internal transmitter delay, and/or may be substantially less. The duration of time between points 202 and 212 may be selected or set such that it is larger than the combined internal audio transmitter delay, internal audio receiver delay, and the duration of time required to traverse the distance between the devices.

At point 213, the audio ranging operation comprises the audio transmitter transitioning the emitted audio ranging signal from the first frequency to a second frequency. Step 213 may be the "third point in time" at which the audio transmitter begins emitting the transition of the audio ranging signal from the first frequency to the second frequency. The delay between points 212 and 213 may be similar or identical to the delay between points 202 and 203, wherein the delay is based on the digital and analog delays associated with the audio transmitter.

In some examples, transitioning the audio ranging signal from the first frequency to the second frequency comprises causing the output of the audio transmitter to begin transitioning from outputting the audio ranging signal at the first frequency to outputting the audio ranging signal at the second frequency at the third point in time. Even though the determination to begin the transition occurs at point 212, the internal delay associated with the audio transmitter may cause emission of the transition to begin at point 213.

In some examples, the transition of the audio ranging signal from the first frequency to the second frequency may be performed in a phase-continuous manner. A phase-continuous transition may involve the transmitter making the transition from emitting the audio ranging signal at the first frequency to emitting the audio ranging signal at the second frequency at a zero-crossing of the first frequency, thereby ensuring that the phase of the output audio ranging signal remains the same when the transmitter switches the output frequency from the first to the second frequency. Making the transition in a phase-continuous manner rather than introducing an abrupt change to the phase of the output audio ranging signal, or some other type of transition, enables the system to maintain a quasi-steady state operation by using continuous energy. The audio receiver detection method for determining that it has received the audio ranging signal may rely on this continuous energy (e.g., via the use of one or more resonators), thus making a phase-continuous transition more optimal. If a non-phase-continuous transition were to be used instead, the audio ranging signal may include additional noise and/or artifacts (e.g., discontinuous jumps) which reduce the ability of the audio receiver to accurately determine the time at which the transition occurred. The reduced accuracy of the audio receiver would then translate to a reduced accuracy in determining the distance between the audio transmitter and the audio receiver.

During the duration of time between point 213 and point 217, the audio ranging signal transition may traverse the distance between the audio transmitter and the audio receiver. This duration of time is an important metric used to determine the distance between the two devices.

At point 217, the audio receiver begins receiving the transition of the audio ranging signal from the first frequency to the second frequency. Point 217 may be referred to as the "fourth point in time" at which point the transition of the audio ranging signal from the first frequency to the second frequency is received by the audio receiver.

At point 218, the acoustic ranging operation may involve the audio receiver processing the transition of the audio ranging signal and determining that the transition of the audio ranging signal from the first frequency to the second frequency has been received. The delay between point 217 and point 218 may be the same delay as discussed above between point 207 and point 208. Alternatively, the delay between point 217 and point 218 may be different. For example, if the audio receiver entered an audio ranging state at point 208, part of that audio ranging state may comprise the audio receiver preparing for the reception of the transition of the audio ranging signal, thereby reducing the internal delay in detection by the audio receiver.

With reference to the points of the audio ranging operation illustrated in FIG. 2, some of these points may be directly measurable (e.g., the timing associated with these points may be directly measurable), while other points may only be estimable. In particular, points 202, 208, 212, and 218 may be directly measurable or determinable based on the audio transmitter and audio receiver processors, and their use of a common or synced clock. Each point illustrated in FIG. 2 may have an associated time stamp based on the common or synced clock, which can be used to determine the time or duration between any two given points. These times or durations can then be used to make one or more calculations or determinations as detailed herein. A time stamp associated with the determination to begin transmitting the audio ranging signal (e.g., point 202) and to begin transitioning the audio ranging signal to the second frequency (e.g., point 212) may be directly determined. Further, a time stamp associated with the determination that the audio ranging signal has been received (e.g., point 208) and that the transition of the audio ranging signal has been received (e.g., point 218) may also be directly determined.

In contrast, there may not be a directly determinable time stamp associated with the point in time at which the audio transmitter actually begins emitting the audio ranging signal (e.g., point 203), the point in time at which the audio receiver begins receiving the audio ranging signal (e.g., point 207), the point in time at which the audio transmitter begins emitting the transition of the audio ranging signal (e.g., point 213), and the point in time at which the audio receiver begins receiving the transition of the audio ranging signal (e.g., point 217). The exact timing of points 203, 207, 213, and 217 may be indirectly determined based on the directly determinable points in time (e.g., points 202, 208, 212, and 218) in addition to the known delays associated with the audio transmitter and the audio receiver.

Using these principles, the first point in time (point 203) at which the transmitter begins emitting the audio ranging signal at the first frequency can be determined based on the known timing of point 202 and the known audio transmitter delay. Point 203 can be determined by adding the known internal transmitter delay to the time stamp associated with point 202. Similarly, the second point in time (point 207) at which the audio receiver begins receiving the audio ranging signal can be determined based on the known timing of point 208, and the known audio receiver delay. Point 207 can be determined by subtracting the known internal receiver delay from the time stamp associated with point 208. The third point in time (point 213) at which the audio transmitter begins emitting the transition of the audio ranging signal can be determined based on the known timing of point 212, and the known audio transmitter delay. Point 213 can be determined by adding the known internal transmitter delay to the time stamp associated with point 212. Further, the fourth point in time (point 217) at which the audio receiver begins receiving the transition of the audio ranging signal can be determined based on the known timing of point 218, and the known audio receiver delay. Point 217 can be determined by subtracting the known internal receiver delay from the time stamp associated with point 218.

After point 218, the system may be configured to determine the distance 130 between the audio transmitter 110 and the audio receiver 120. The distance 130 may be determined based on (1) the difference in time between the third point in time and the fourth point in time (e.g., 217-213, or the time of flight of the audio ranging signal), and (2) a determined speed of sound. In some examples, the distance may be determined by the audio receiver itself. In other examples, the distance may be determined by the audio transmitter, by a hub or access point, or by some other communicatively coupled device. In some embodiments the system may be configured to provide a distance estimate from 0-20 ft, with an accuracy of approximately 0.5 inches. For cases in which there is interference caused by external or internal noise sources, the distance estimate accuracy may decrease to approximately 3.3 inches. It should be appreciated that these values are for example only, and that other embodiments may have increased or decreased distance measurement ranges and accuracies.

In some examples, the calculated distance may be used for one or more purposes. For example, the system 100 may use the calculated distance to: (1) determine a maximum gain allowed before feedback occurs (e.g., the highest gain that can be applied to an output audio signal, wherein applying a gain higher than the maximum gain causes feedback to occur), (2) prompt a user to reposition one or more of the devices, (3) provide an indication of the distance to a user via a user interface, (4) modify an algorithm or program executed by one or more of the devices, (5) adjust or modify the directionality of an array of speakers or microphones, and (6) when the system comprises a ceiling or wall mounted microphone, for example, the system can estimate the distance and direction of a speaker relative to the microphone in order to allow for null steering of the microphone array (to reduce echo, speaker noise, etc.). Null steering can include causing the microphone pickup pattern to avoid picking up audio from a particular region, and/or causing audio picked up by the microphone via the null-steered beam to be reduced or removed.

In some examples, the audio system 100 may be part of a larger audio system or "eco-system" that comprises one or more speakers, speaker arrays, beamforming systems, microphones, microphone arrays, digital signal processors (DSPs), mixers, and/or other components. One or more of the components may be coupled to each other via wired or wireless communication paths. The speakers and/or microphones may be standalone speakers or microphones, or standalone speaker arrays or microphone arrays. Alternatively, the speakers and/or microphones may be part of a multi-purpose component, that may comprise functionality of the speaker, microphone, and/or another component of the eco-system. In some embodiments, microphones of the ecosystem may provide improved performance, including minimization of crosstalk and acoustic echo cancellation (AEC) through higher source receiver isolation. In some embodiments, the eco-system can be configured to simultaneously produce a plurality of individual audio outputs using various speakers, or combinations of speakers, and direct each audio output towards a designated location or listener.

The ecosystem may be used in open office environments, conference rooms, museums, performance stages, airports, and many other environments. The acoustic distance ranging operation may be performed within the ecosystem in order to carry out one or more actions described herein, such as modifying a gain associated with a particular ecosystem element, prompting a user to reposition an ecosystem element, etc.

In some examples, the acoustic distance ranging operation can be performed for multiple different devices in the same system (or within the ecosystem). In these cases, additional actions are possible as well. For example, when a system comprises a tabletop speaker equipped with two or more microphone arrays (e.g., for use in a conference room), the distance calculation can be used to achieve proper inter-array spacing by indicating that two arrays are too close to each other. Additionally, when a plurality of like-oriented microphone arrays are included in a system, the system can use the speaker (e.g., audio transmitter) to calculate distances between both the speaker and each microphone array, enabling a mapping of the placement of each microphone array and the speaker. If the arrays are not like-oriented, knowledge of the orientation of each microphone array can be input (e.g., by a user, or by gathering of additional information from one or more other sources), the same calculations can be performed. Like-oriented arrays may be present where the system comprises a square or rectangular ceiling mounted array, oriented in one of four different directions. If the system does not include a ceiling mounted form factor, orientation can be determined based on ordinal directions.

In some examples, both the audio transmitter and the audio receiver operate or share a common clock for measurement of the times associated with the various points shown in FIG. 2. The common clock may take the form of precision time protocol (PTP), network time protocol (NTP), NTC, Dante, or another common clock mechanism or technique.

In some examples, as noted above, the system operates by transmitting the audio ranging signal at a first frequency, and then transitioning the audio ranging signal to a second frequency. The timing associated with the transition of the audio ranging signal is then used to determine the time of flight between the devices. One benefit of using the approach described herein is that the emission of the audio ranging signal at the first frequency and the transition to a second frequency allows the audio ranging signal to be transmitted above a noise floor in the environment in which the system is used. If instead of the approach used herein, the system merely used the transition of the audio ranging signal from being off to being on, the noise floor may cause issues. For example, the receiver may mistakenly determine that the audio ranging signal has been received, and/or may be less accurate in determining the time at which the audio ranging signal was turned on. In contrast, using the approach of the present disclosure, the audio receiver can more easily determine that the audio ranging operation is underway, because detecting a transition in the audio ranging signal from a first frequency to a second frequency is easier than detecting a transition from no audio ranging signal to any given audio ranging signal. The approach of the present disclosure also requires less complexity and processing power, due to the known first frequency and second frequencies, and the ability to avoid dealing with the noise floor. Additionally, using the transition of the audio ranging signal as the measurement point for a ranging calculation, or for the purpose of measurement (rather than simply using the beginning of the audio ranging signal being emitted), results in reduced temporal transients. Temporal transients occur when a signal is abruptly switched on, for example, which results in the amplitude of the signal oscillating above and below the desired steady state response. Using the approach of the present disclosure that comprises having the audio transmitter already emitting the audio ranging signal when it transitions from the first frequency to the second frequency, the transmitter does not go from an off state to an on state, and thus there are no temporal transients introduced from an off-to-on transition of the transmitter. Rather, the audio transmitter remains in the on state, and merely transitions from one frequency to another. By remaining in the on state, the speaker of the transmitter is already in motion when the transition between frequencies occurs, thereby removing the additional mechanical delay required to bring the speaker from an off state to an on state, and allowing for more accurate and precise measurements to be made.

In some examples, the first frequency and the second frequency may be in the range of 20 Hz to 20 kHz. This range corresponds to the available range of many speakers, and thus the system does not require new specialized hardware to operate. In some examples, the first and second frequencies may be in the range of 1 kHz to 2 kHz. For instance, the first frequency may be 1 kHz, and the second frequency may be 2 kHz. Frequencies in this range may be preferred due to the relatively low interference, high signal to noise ratio, and uniform sound pressure. Specifically, very low frequencies may be avoided due to the likelihood of interference and contamination of the signal as it moves through the air. Additionally, low-mid range frequencies may be preferred because they provide a better trade off in their dispersal pattern, by providing a less directional signal, which may ensure or improve linearity of the audio transmitter and the audio receiver.

It should be appreciated that while specific frequencies are listed, any frequency that is transmittable by the audio transmitter as a sound wave and is receivable by the audio receiver may be used. Furthermore, while the present disclosure discusses examples in terms of a first frequency and a second frequency, each of the first and second frequencies may comprise a plurality or multiple frequencies transmitted together rather than a single tone. However, as noted in the examples above, the first and second frequencies may be single frequencies or tones.

Figure 3:
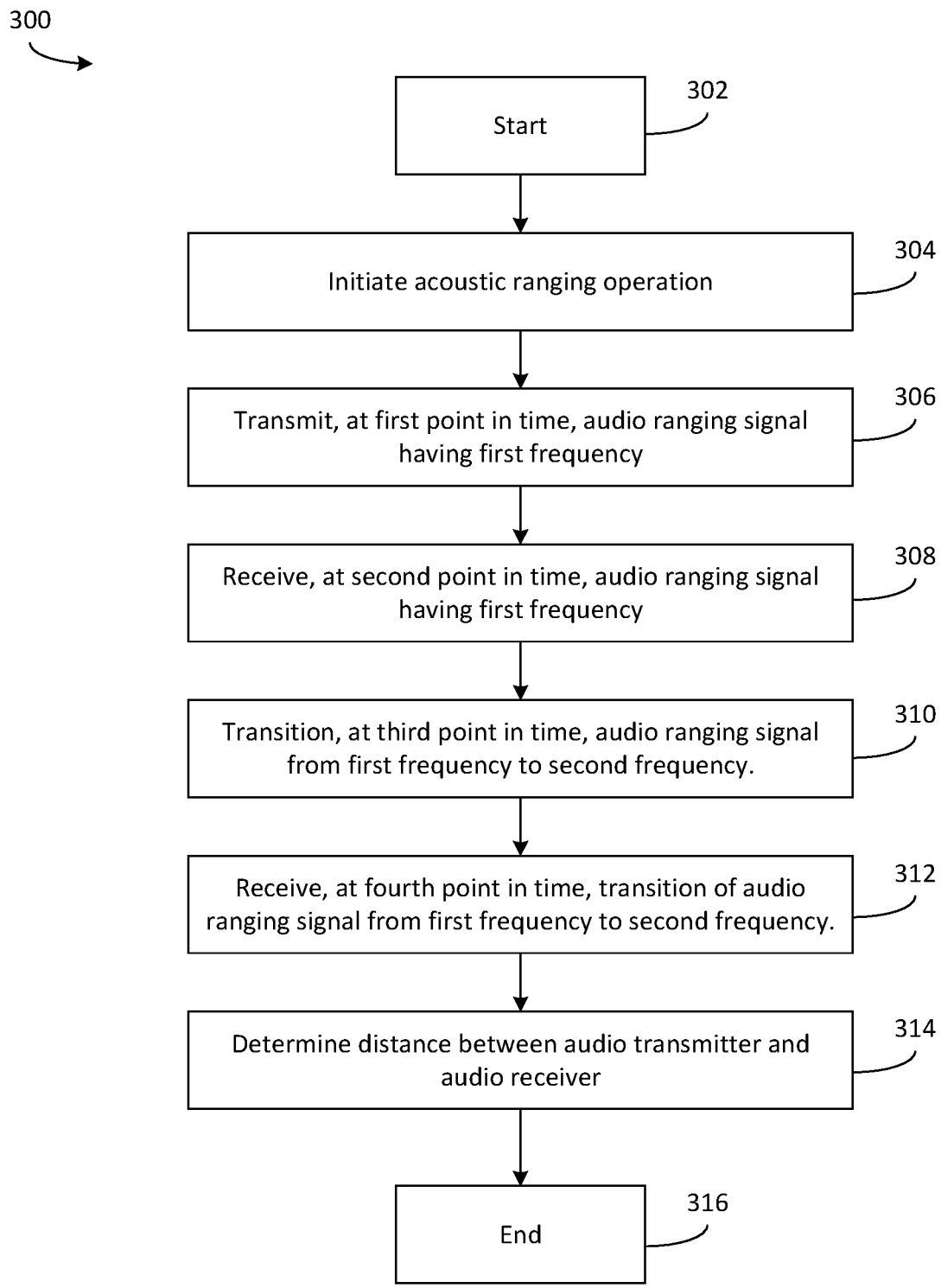
FIG. 3 is a flowchart illustrating an example method related to the timing diagram of FIG. 2.

FIG. 3 illustrates a flow chart of an example method 300 according to embodiments of the present disclosure. Method 300 may enable the operation of an audio system to determine a distance between two or more devices of the system. The flowchart of FIG. 3 is representative of machine-readable instructions that are stored in memory and may include one or more programs which, when executed by a processor may cause one or more computing devices and/or systems to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may comprise initiating an acoustic ranging operation. This may be done by a user via a user interface of the audio system, or may be done automatically by the audio system or based on some other trigger.

At block 306, method 300 may comprise transmitting, at a first point in time by an audio transmitter of the audio system, an audio ranging signal having a first frequency. At block 308, method 300 may comprise receiving, at a second point in time by an audio receiver of the audio system, the audio ranging signal having the first frequency. At block 310, method 300 may comprise transitioning, at a third point in time by the audio transmitter, the audio ranging signal from the first frequency to a second frequency. At block 312, method 300 may comprise receiving, at a fourth point in time by the audio receiver, the transition of the audio ranging signal from the first frequency to the second frequency. At block 314, method 300 may comprise determining a distance between the audio transmitter and the audio receiver. The distance may be determined based on (1) a difference between the third point in time and the fourth point in time, and (2) a determined speed of sound. It should be appreciated that various actions may be taken by one or more devices of the audio system based on the determined distance, such as those actions noted above. Method 300 may then end at block 316.

The method of FIG. 3 illustrates that the audio transmitter transitions from outputting the audio ranging signal at the first frequency to outputting the audio ranging signal at the second frequency after reception of the audio ranging signal at the first frequency by the audio receiver. However, the order of events noted above is not necessarily required, and is merely one example of the order of events. In some embodiments, the audio transmitter may begin the transition from outputting the audio ranging signal at the first frequency to outputting the audio ranging signal at the second frequency before the audio ranging signal at the first frequency is received by the audio receiver. The timing between the initial transmission of the audio ranging signal at the first frequency and the beginning of the transition to the audio ranging signal at the second frequency by the audio transmitter occurs or is controlled independently from when the audio receiver receives the audio ranging signal at the first frequency.

Figure 4:
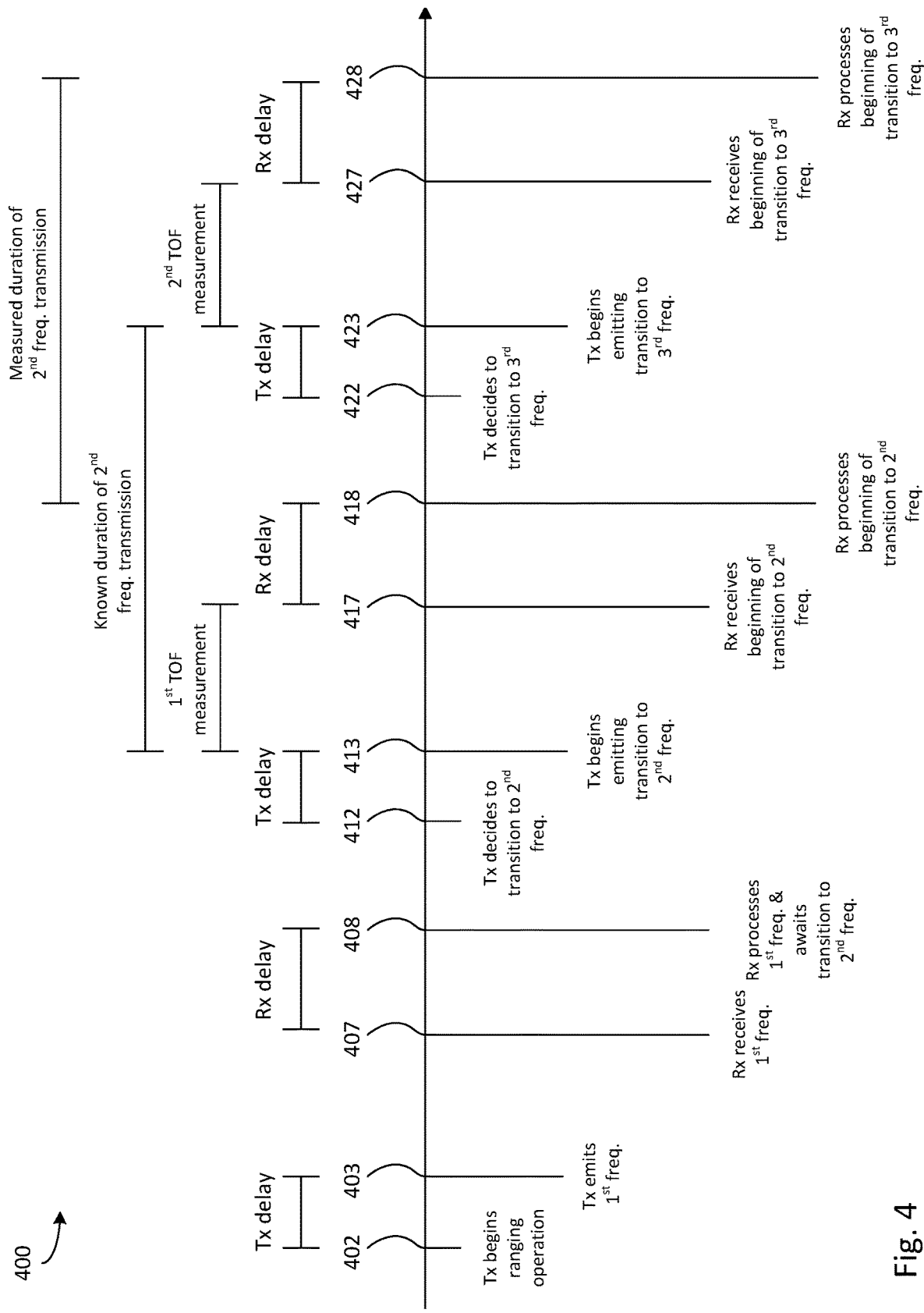
FIG. 4 is a simplified schematic diagram of an example timing of an acoustic distance ranging operation involving an audio ranging signal transitioning between three frequencies, in accordance with some embodiments.

FIG. 4 illustrates a simplified schematic diagram of an example timing of a second acoustic distance ranging operation. The second acoustic distance ranging operation illustrated in FIG. 4 may be similar or identical to the example shown in FIG. 2. The example 400 shown in FIG. 4 may comprise one or more additional steps or features not included in the example 200 shown in FIG. 2.

As noted above, using the acoustic distance ranging operation shown in FIG. 2, the distance between the transmitter and the receiver can be determined based on timing associated with the transmission of an audio ranging signal at a first frequency and the transition to transmission of the audio ranging signal at a second frequency. In some cases, there may be limits to the accuracy of the distance determination using only a first frequency and the transition to the second frequency. The accuracy limit may be based on the limits of the receiver in detecting the audio ranging signal at the first frequency and the transition to the second frequency. In other words, the methods and techniques used to detect the audio ranging signal at the first frequency and the transition to the second frequency introduce a lower limit on the resolution of the distance calculation.

In order to improve the resolution of the distance calculation with respect to the first acoustic distance ranging operation discussed above, various systems may make use of a second acoustic distance ranging operation. FIG. 4 illustrates a second timing diagram 400 of certain events that occur during the second acoustic distance ranging operation.

Points 402, 403, 407, 408, 412, 413, 417, and 418 may be similar or identical to points 202, 203, 207, 208, 212, 213, 217, and 218 discussed in detail above. In particular, the transmitter may decide to transmit the audio ranging signal at a first frequency at point 402, and begin transmitting the audio ranging signal at the first frequency at 403 (due to an internal transmitter delay between points 402 and 403). The receiver may receive the audio ranging signal at the first frequency beginning at point 407, and after an internal receiver delay, determine that the audio ranging signal at the first frequency has been received at point 408. The transmitter may then decide to transition to emitting the audio ranging signal at a second frequency at point 212, and begin actually emitting the audio ranging signal at the second frequency at point 413 (due to the internal transmitter delay between points 412 and 413). At point 417, the receiver may begin receiving the transition of the audio ranging signal to the second frequency, and a point 418 that transition may be detected by the receiver (due to the internal receiver delay between points 417 and 418).

Up to point 418, the first timing diagram 200 is identical to the second timing diagram 400. The second timing diagram illustrates a further transition to transmission of the audio ranging signal at a third frequency after a known duration of transmission of the audio ranging signal at the second frequency. At point 422, the transmitter decides to begin the transition to emitting the audio ranging signal at the third frequency. At point 423, the transmitter actually begins transmitting the audio ranging signal at the third frequency (due to the internal transmitter delay between points 422 and 423). Then at point 427, the receiver begins receiving the audio ranging signal at the third frequency. And at point 428, the receiver determines that the audio ranging signal at the third frequency is being received (due to the internal receiver delay between points 427 and 428).

The second timing diagram 400 illustrates that there are two separate pairs of measurements that can be used to determine the time of flight (TOF) between the audio transmitter and audio receiver, and thus two separate calculations that can be used to determine the distance between them. These two pairs of measurements correspond to (1) the duration of time between points 413 and 417 (labeled as the $1^{st}$ TOF measurement in FIG. 4), and (2) the duration of time between points 423 and 427 (labeled as the $2^{nd}$ TOF measurement).

Furthermore, by transmitting the audio ranging signal at the second frequency for a known duration (e.g., the duration of time from point 412 to point 422, or from point 413 to point 423, assuming the transmitter delay is generally constant), the system can make a comparison between the known duration and the actual measured duration (e.g., the duration of time from point 418 to point 428). If there is agreement between the known duration and the measured duration, then the system can be confident that there were no errors in determining the time at which the detection of the transitions in the audio ranging signal from the first frequency to the second frequency, and in the audio ranging signal from the second frequency to the third frequency occurred.

However, if there is disagreement, that is an indication that there was an error in determining the time corresponding to the transition of the audio ranging signal to the second frequency (e.g., point 418) or the transition of the audio ranging signal to the third frequency (e.g., point 428). The system can then correct for this error in measurement (as discussed in further detail below), thereby increasing the resolution of the distance measurement made using these points in time.

The selection of the first, second, and third frequencies (the second and third frequencies in particular) enables differentiation between the possible error combinations associated with the measured duration of the transmission of the audio ranging signal at the second frequency. The choice of specific second and third frequencies enables the determination of whether the measurement of point 418, point 428, or both included an error, and also enables the determination of the appropriate correction.

Detecting the point in time at which the transition of the audio ranging signal to the second and/or third frequency (e.g., points 418 and 428) occurred can include the use of one or more resonators. Looking at the transition to the second frequency in particular, when the receiver begins receiving the audio ranging signal at the second frequency, the resonator (which may be tuned to the second frequency) may begin exponentially increasing a signal output. However, due to noise, interference, and other effects, there may not be sufficient confidence or clarity regarding the specific point in time at which the audio ranging signal at the second frequency emitted by the transmitter was first picked up by the receiver. To make a determination that the audio ranging signal at the second frequency has in fact been received (and that it is not merely noise or interference), the receiver may look for a specific increase over some number of cycles, samples, or wavelengths of the second frequency (e.g., 4 consecutive increasing peaks in a row), and then look back to the point in time at which the exponential increase began. The resonator signal may be filtered such that an absolute value is taken, meaning that successive peaks in the signal are a half wavelength apart. Operating as noted above may enable the system to determine with sufficient confidence that the audio ranging signal at the second frequency has been received, and at what specific time it was received, to within a half wavelength of certainty. However, due to the nature of the determination based on the resonator signal, an error can be introduced equal to +/− a half wavelength of the second frequency. The error is introduced because noise in the resonator may make it such that it is unclear which of two consecutive peaks (which are a half wavelength apart) is the beginning of the reception of the audio ranging signal at the second frequency.

The uncertainty in these detections means that determining the measured duration of transmission of the audio ranging signal at the second frequency (e.g., the difference between points 418 and 428) can include one of nine possible error combinations, e.g., one of the nine permutations of (a) the determination of point 418 being off by +½ wavelength, being correct, and being off by −½ wavelength, and (b) the determination of point 428 being off by +½ wavelength, being correct, and being off by −½ wavelength.

The selection of the first, second, and third frequencies (and in particular the second and third) may allow for differentiation between the nine possible error combinations. The frequencies may also be selected based on their susceptibility or resilience to local noise sources, such as HVAC, lighting, etc. Further, the first, second, and third frequencies, and sampling rate, may be selected such that each frequency has a half wavelength that is an integer number of samples. In one example, the first, second, and third frequencies may be in the range of 20 Hz to 20 kHz. In a particular, example, the first frequency may be 1 kHz, the second frequency may be 2 kHz, and the third frequency may be 800 Hz.

In one example, the second and third frequencies may be selected such that they have half wavelengths of M and N samples respectively. These frequencies may be selected such that each of the nine possible error combinations has a different value, wherein the nine combinations may comprise any of the following: (1) −M,−N; (2) −M,0; (3) −M,+N; (4) 0, −N; (5) 0,0; (6) 0, +N; (7) +M,−N; (8) +M,0; (9) +M,+N.

Since only one of the nine error combinations can occur at a time (i.e., they are differentiated based on the selected frequencies), the system can correct for the error in measurement. In practice, since the frequencies are known, the determination of the appropriate correction to apply can comprise looking up the measured duration of the transmission of the audio ranging signal at the second frequency (e.g., the different between point 428 and point 418) in a lookup table comprising the expected duration plus each of the nine possible errors, and determining which is a best fit. If the expected duration is, for example, one second, the lookup table may comprise nine different durations clustered around one second. The measured duration will be close or equal to one of these nine possible durations, assuming the error in each measurement of 418 or 428 is off by at most ½ the respective wavelength of the second and third frequencies.

Once the error is known, the system can then determine the precise time at which point 417 and point 427 occurred, factoring in the determined correction. The system then has two separate time of flight measurements that can be used to determine the distance between the transmitter and the receiver. The first time of flight measurement is between points 413 and 417, and the second time of flight measurement is between points 423 and 427. These durations, along with the speed of sound, can then be used to determine the distance between the transmitter and receiver.

Figure 5:
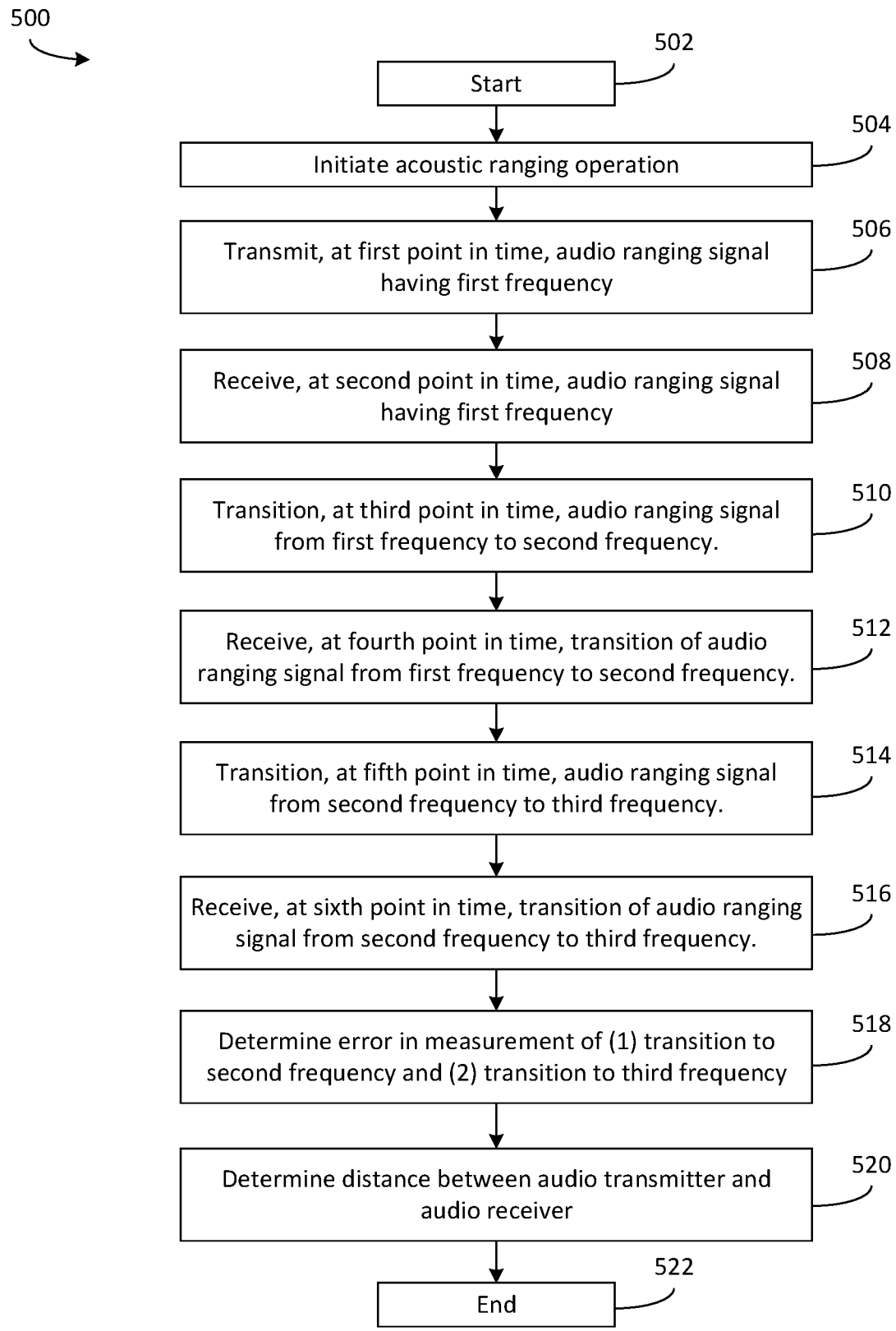
FIG. 5 is a flowchart illustrating an example method related to the timing diagram of FIG. 4.

FIG. 5 illustrates a flow chart of an example method 500 according to embodiments of the present disclosure. Method 500 may enable the operation of an audio system to determine a distance between two or more devices of the system. The flowchart of FIG. 5 is representative of machine-readable instructions that are stored in memory and may comprise one or more programs which, when executed by a processor may cause one or more computing devices and/or systems to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may be similar or identical to method 300 in one or more respects. For instance, blocks 502, 504, 506, 508, 510, and 512 may be similar or identical to blocks 302, 304, 306, 308, 310, and 312 discussed above.

At block 514, method 500 may comprise transitioning, at a fifth point in time, the audio ranging signal from the second frequency to a third frequency. At block 516, method 500 may comprise the receiver receiving, at a sixth point in time, the transition of the audio ranging signal from the second frequency to the third frequency.

At block 518, method 500 may comprise determining whether there is an error in the measurement of (1) the time at which the transition of the audio ranging signal from the first frequency to the second frequency was received by the receiver, and (2) the time at which the transition of the audio ranging signal from the second frequency to the third frequency was received by the receiver.

At block 520, the method may comprise determining the distance between the audio transmitter and the audio receiver. The distance determination may be based on one or more of: (1) the time at which the transmitter began transmitting the transition of the audio ranging signal from the first to the second frequency, (2) the time at which the transmitter began transmitting the transition of the audio ranging signal from the second frequency to the third frequency, (3) the measured time at which the transition of the audio ranging signal from the first to the second frequency was received by the receiver, (4) the measured time at which the transition of the audio ranging signal from the second to the third frequency was received by the receiver, (5) the determined error in measurement of when the transition of the audio ranging signal from the first to the second frequency was received by the receiver, (6) the determined error in measurement of when the transition of the audio ranging signal from the second to the third frequency was received by the receiver, and (7) the speed of sound. Method 500 may then end at block 522.

Any process descriptions or blocks in figures should be understood as representing modules, segments, or portions of code which comprise one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method comprising:
    operating an audio transmitter and an audio receiver using a common clock;
    transitioning, by the audio transmitter and at a first point in time, an audio ranging signal in a phase-continuous manner from a first frequency to remain at a second frequency for a predetermined duration;
    receiving, at a second point in time and by the audio receiver, the audio ranging signal transitioned from the first frequency to remain at the second frequency;
    determining a distance between the audio transmitter and the audio receiver based on: (1) a difference between the first point in time and the second point in time, and (2) a determined speed of sound;

transitioning, by the audio transmitter and at a third point in time, the audio ranging signal in a phase-continuous manner from the second frequency to remain at a third frequency;

receiving, at a fourth point in time and by the audio receiver, the audio ranging signal transitioned from the second frequency to remain at the third frequency; and correcting the distance to a modified distance between the audio transmitter and the audio receiver, comprising:
measuring a duration of the transmission of the audio ranging signal at the second frequency, the duration comprising a difference between the fourth point in time and the second point in time;
determining a correction to the distance based on a comparison between the measured duration and the predetermined duration; and
updating the distance to the modified distance based on the correction.

2. The method of claim 1, wherein the distance between the audio transmitter and the audio receiver is further determined based on:
a transmitter hardware delay associated with the audio transmitter; and
a receiver hardware delay associated with the audio receiver.

3. The method of claim 1, further comprising:
determining, based on the determined distance between the audio transmitter and the audio receiver, a maximum gain above which feedback occurs; and
modifying, based on the determined maximum gain, a gain of the audio transmitter.

4. The method of claim 1, wherein the audio receiver comprises an audio receiver array, and the method further comprises modifying a lobe pattern of the audio receiver array based on the determined distance between the audio transmitter and the audio receiver to enable null-steering with respect to the audio transmitter.

5. The method of claim 1, wherein receiving the audio ranging signal transitioned from the first frequency to the second frequency comprises detecting the audio ranging signal transitioned from the first frequency to the second frequency using a resonator of the audio receiver.

6. A method of operating an audio transmitter, the method comprising:
operating the audio transmitter using a common clock with an audio receiver;
transmitting by the audio transmitter and to the audio receiver, an audio ranging signal having a first frequency;
at a first point in time, transitioning the audio ranging signal in a phase-continuous manner from the first frequency to remain at a second frequency for a predetermined duration, wherein the audio ranging signal transitioned from the first frequency to remain at the second frequency is received by the audio receiver at a second point in time, and a distance between the audio transmitter and the audio receiver is determinable based on (1) a difference between the first point in time and the second point in time, and (2) a determined speed of sound;
at a third point in time, transitioning the audio ranging signal in a phase-continuous manner from the second frequency to remain at a third frequency, wherein the audio ranging signal transitioned from the second frequency to remain at the third frequency is received by the audio receiver at a fourth point in time, and wherein the distance is corrected to a modified distance based on comparing the predetermined duration to a measured duration that comprises a difference between the fourth point in time and the second point in time.

7. The method of claim 6, wherein the distance between the audio transmitter and the audio receiver is further determinable based on a transmitter hardware delay associated with the audio transmitter.

8. The method of claim 6, further comprising:
determining, based on the distance between the audio transmitter and the audio receiver, a maximum gain above which feedback occurs; and
modifying, based on the determined maximum gain, a gain of the audio transmitter.

9. The method of claim 6, wherein the first frequency and the second frequency are within the range of 1 kHz to 2 kHz.

10. The method of claim 6, wherein the audio ranging signal transitioned from the first frequency to the second frequency is detected by the audio receiver at the second point in time using a resonator.

11. A method of operating an audio receiver, the method comprising:
operating the audio receiver using a common clock with an audio transmitter;
receiving, by the audio receiver, an audio ranging signal having a first frequency transmitted by the audio transmitter; and
after an occurrence of a transmission, by the audio transmitter, of a transition of the audio ranging signal in a phase-continuous manner from the first frequency to remain at a second frequency at a first point in time for a predetermined duration, receiving, by the audio receiver at a second point in time, the transition of the audio ranging signal from the first frequency to remain at the second frequency, wherein a distance between the audio transmitter and the audio receiver is determinable based on (1) a difference between the first point in time and the second point in time, and (2) a determined speed of sound;
after an occurrence of a transmission, by the audio transmitter, of a transition of the audio ranging signal in a phase-continuous manner from the second frequency to remain at a third frequency at a third point in time, receiving, by the audio receiver at a fourth point in time, the transition of the audio ranging signal from the second frequency to remain at the third frequency, wherein the distance is corrected to a modified distance based on comparing the predetermined duration to a measured duration that comprises a difference between the fourth point in time and the second point in time.

12. The method of claim 11, wherein the distance between the audio transmitter and the audio receiver is further determined based on a receiver hardware delay associated with the audio receiver.

13. The method of claim 11, wherein the audio receiver comprises an audio receiver array, and the method further comprises modifying a directionality of the audio receiver array based on the determined distance between the audio transmitter and the audio receiver.

14. The method of claim 11, wherein the audio receiver comprises a audio receiver array, and the method further comprises modifying a lobe pattern of the audio receiver array based on the determined distance between the audio transmitter and the audio receiver to enable null-steering with respect to the audio transmitter.

15. The method of claim 11, wherein receiving the transition of the audio ranging signal from the first frequency to the second frequency comprises detecting the transition using a resonator of the audio receiver.

\* \* \* \* \*